United States Patent [19]

Leonti et al.

[11] Patent Number: 4,963,759
[45] Date of Patent: Oct. 16, 1990

[54] MCPHERSON-TYPE MOTOR-VEHICLE SUSPENSION

[75] Inventors: Sergio Leonti; Lorenzo Garro, both of Torino, Italy

[73] Assignee: Fiat Auto S.p.A., Torino, Italy

[21] Appl. No.: 337,697

[22] Filed: Apr. 13, 1989

[30] Foreign Application Priority Data

Apr. 19, 1988 [IT] Italy ..............................67365 A/88

[51] Int. Cl.$^5$ .............................................. B62D 7/00
[52] U.S. Cl. ..................................... 280/691; 280/688; 280/91
[58] Field of Search ................ 280/688, 91, 715, 724, 280/691

[56] References Cited

U.S. PATENT DOCUMENTS

| | | | |
|---|---|---|---|
| 4,341,397 | 7/1982 | Morimura et al. | 280/688 |
| 4,603,882 | 8/1986 | Kijima et al. | 280/689 |
| 4,616,845 | 10/1986 | Pettibone | 280/688 |

Primary Examiner—Richard A. Bertsch
Attorney, Agent, or Firm—Sughrue, Mion, Zinn, Macpeak & Seas

[57] ABSTRACT

In a motor-vehicle rear suspension in which each wheel support (2) is connected to a McPherson-type upright (7) and is also guided by means of two transverse arms (5a, 5b) having their ends articulated to the body and to the wheel support respectively, one of these transverse arms (5b) is connected to an actuator for controlling its position in a transverse direction. The actuator is preferably constituted by a hydraulic actuator (15) which is activated in a predetermined manner to steer the rear wheels while the motor-vehicle is negotiating turns.

3 Claims, 2 Drawing Sheets

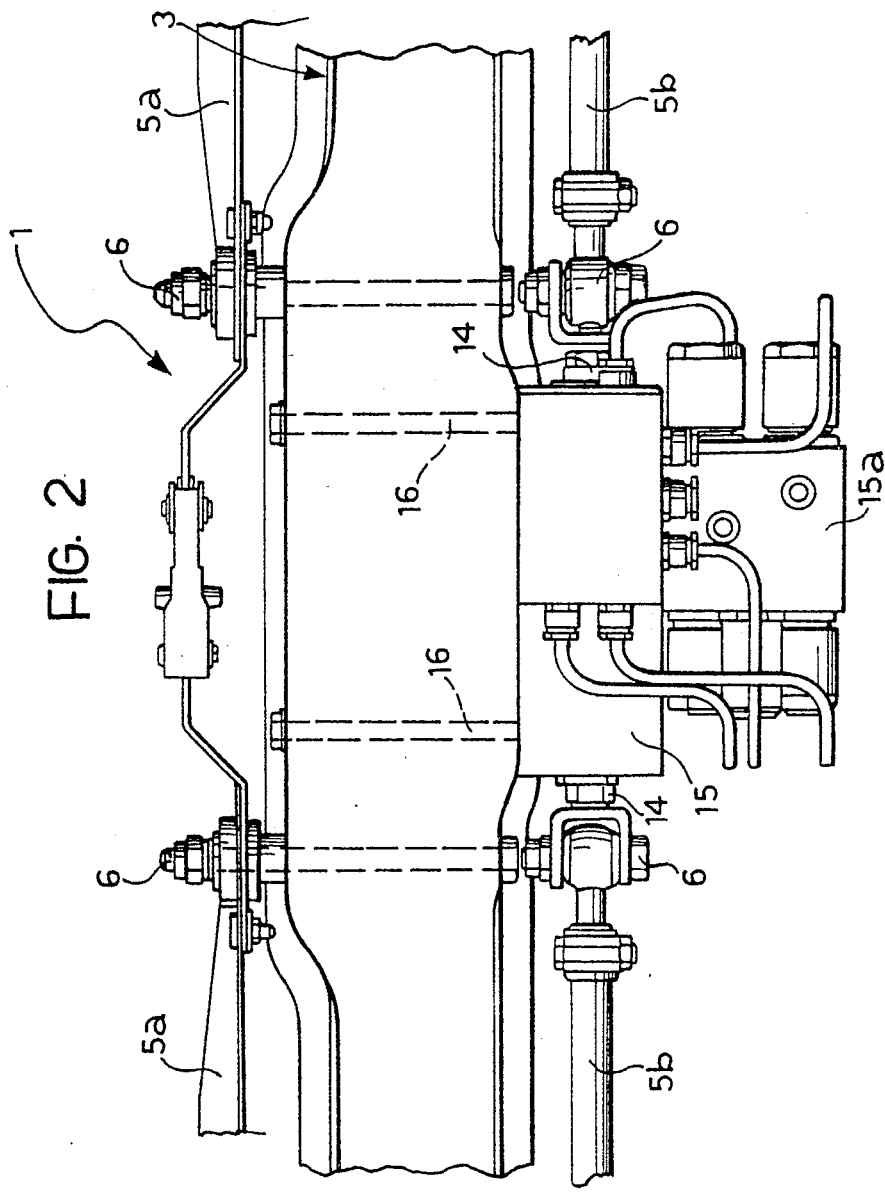

MCPHERSON-TYPE MOTOR-VEHICLE SUSPENSION

BACKGROUND OF THE INVENTION

The present invention relates to motor-vehicle rear suspensions, of the type in which each wheel support is connected to a McPherson-type upright and is also guided by means of a front transverse arm and a rear transverse arm whose ends are articulated to the body and to the wheel support respectively.

In the present description and in the claims which follow, the term "transverse" is used with reference to a direction substantially perpendicular to a vertical longitudinal plane of the motor vehicle.

SUMMARY OF THE INVENTION

The object of the present invention is to produce a suspension of the type indicated above which has a structure which is simple and of relatively low cost and which at the same time enables the rear wheels to be steered whilst the vehicle is moving.

In order to achieve this object, the suspension according to the invention is characterised in that the articulations of the ends of the transverse arms of the suspension comprise ball joints and that one of the two transverse arms associated with each wheel is connected to actuator means for controlling the position of the arm in a transverse direction.

The actuator means are preferably constituted by a hydraulic actuator whose supply is controlled by an electrovalve of the proportional, electrically pilotable type which is in turn connected to an electronic system for controlling the steering.

The main advantage of the suspension according to the invention lies in the fact that it has a relatively simple and compact structure. In particular, it can be produced by the modification, by relatively simple operations, of a suspension of the type indicated above, whose rear wheels are originally not steerable. The controlled rear-wheel steering capability can in fact be achieved simply by the provision of resilient bushes or a ball joint in correspondence with each articulation of the transverse arms and by joining one of the two transverse arms of each wheel to a hydraulic actuator carried by the body of the motor vehicle.

BRIEF DESCRIPTION OF THE DRAWINGS

Further characteristics and advantages of the present invention will become clear from the detailed description which follows with reference to the appended drawings, provided by way of non-limiting example, in which:

FIG. 2 is a plan view of a detail of FIG. 1.

DETAILED DESCRIPTION OF THE PREFERRED EMBODIMENTS

Figure 1:
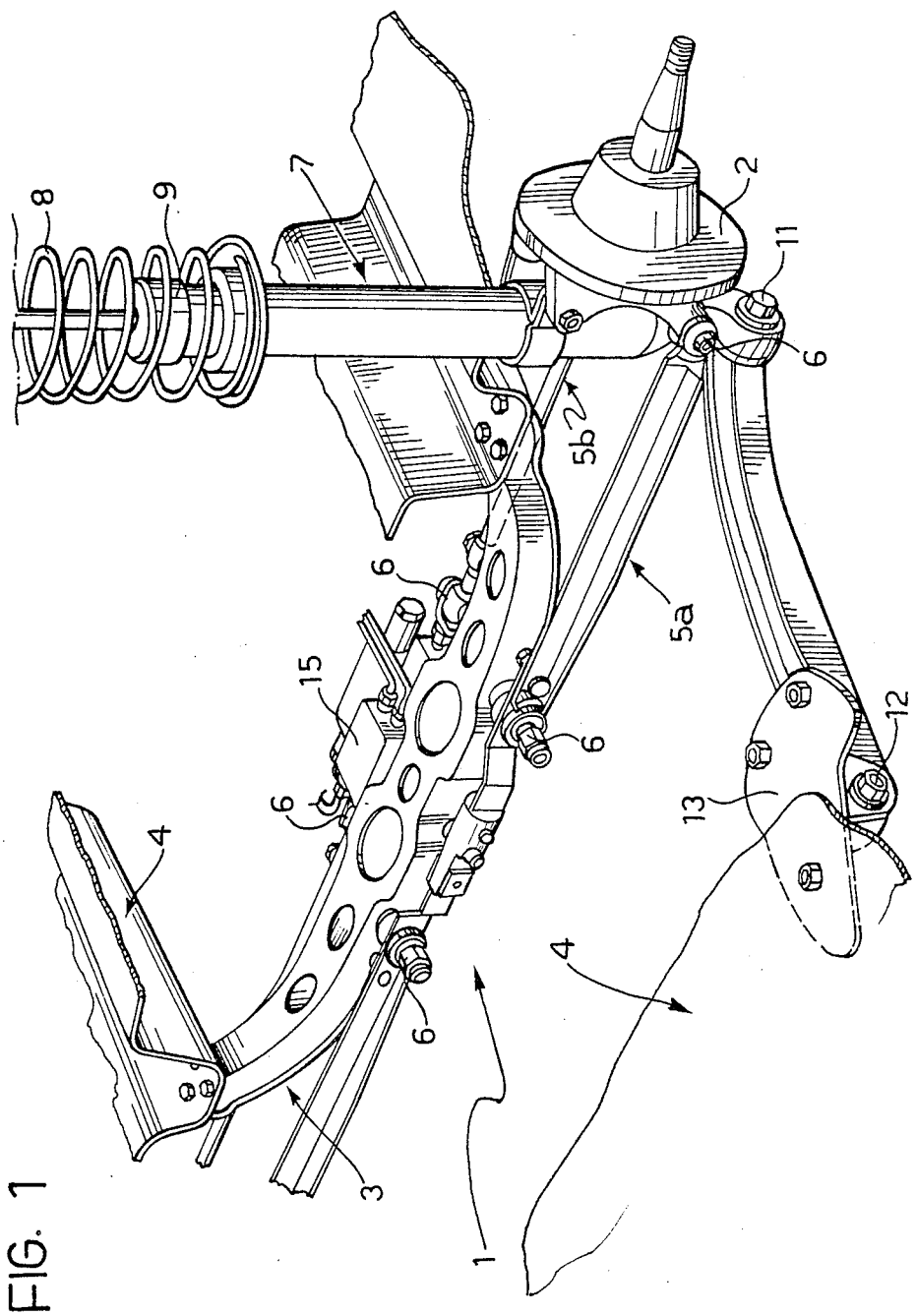
FIG. 1 is a schematic perspective view of a rear suspension according to the invention.

With reference to the drawings, each wheel support 2 of a motor vehicle rear suspension generally indicated 1, is connected to a sheet-metal cross member 3 fixed to the body 4 of the motor car by means of a front transverse arm 5a and a rear transverse arm 5b. Each of these arms has end articulations 6 comprising ball joints or resilient bushes. Each wheel support 2 is also associated with a McPherson-type upright 7 including a helical spring 8 and a shock-absorber 9, as well as a longitudinal arm 10 articulated at 11 to the support 2 and at 12 to a bracket 13 fixed to the body 4. The inner ends 6 of the two rear transverse arms 5b are not connected to the cross member 3, but to two opposed rods 14 of a hydraulic actuator device 15. The device 15, whose body is fixed to the cross member 3 by means of bolts 16, is not described in detail in the present description, since it may be of any known type.

The activation of the hydraulic actuator 15 causes a variation of the rear transverse arms 5b and a consequent rotation of each wheel support 2 about the articulation 6 of the front transverse arm 5a. It is thus possible to achieve controlled steering of the rear wheels when the motor vehicle is negotiating bends.

The hydraulic actuator is intended to be inserted in a hydraulic circuit including an electrovalve 15a of the proportional, electrically pilotable type, for controlling the supply to the actuator. The solenoid of the electrovalve is intended in turn to be connected in an electrical circuit including a main central control unit for causing steering of the rear wheels according to a predetermined programme, in dependence on a series of driving parameters which are monitored by corresponding sensor means, whose output signals are sent to the main central control unit. The actuator is also provided with on/off safety valves and an electromechanical brake. The electronic control system also includes a position sensor and a control unit for local position control.

The present description and the appended drawings do not go into details of the hydraulic system and the electronic control system, since these systems may be produced in any known manner and do not fall within the scope of the present invention.

As already made clear above, suspensions of the type indicated at the beginning of the present description, in which the rear transverse arms 5b are connected directly to the cross members 3, are already known. The invention enables the rear wheels of a suspension of this type to be steered simply by the insertion of the hydraulic actuator and by the connection of the inner ends of the rear transverse arms to the actuator instead of to the cross member 3. The transformation of a suspension whose wheels are not initially steerable into a suspension according to the invention is therefore achieved by simple operations without alteration of the general geometry and bulk of the suspension.

We claim:

1. A rear suspension for motor vehicles, in which each wheel support (2) is connected to a McPherson-type upright (7) and is also guided by means of a front transverse arm (5a) and a rear transverse arm (5b) whose ends are articulated to the body (4) and to the wheel support (2) respectively, wherein the articulations (6) of the ends of the transverse arms comprise ball joints or resilient bushes and that one of the two arms (5a, 5b) associated with each wheel is connected to hydraulic actuator means (15) for controlling the position of the arm in a transverse direction to provide rear wheel steering.

2. A suspension according to claim 1, wherein the hydraulic actuator means is fixed to the cross member (3) and which has two opposed rods (14) connected to the inner ends of the two rear transverse arms (5b).

3. A suspension according to claim 2, wherein the supply to the hydraulic actuator means (15) is controlled by a proportional, electrically-pilotable electrovalve.

* * * * *